(12) United States Patent
Maekawa et al.

(10) Patent No.: US 7,130,440 B2
(45) Date of Patent: Oct. 31, 2006

(54) CHAIR EQUIPPED WITH A SPEAKER

(75) Inventors: Koji Maekawa, Tendo (JP); Hiroyuki Dohi, Tendo (JP)

(73) Assignees: Pioneer Corporation, Tokyo-to (JP); Tohoku Pioneer Corporation, Yamagata-ken (JP)

( * ) Notice: Subject to any disclaimer, the term of this patent is extended or adjusted under 35 U.S.C. 154(b) by 323 days.

(21) Appl. No.: 10/345,363

(22) Filed: Jan. 16, 2003

(65) Prior Publication Data
US 2003/0152245 A1 Aug. 14, 2003

(30) Foreign Application Priority Data
Feb. 8, 2002 (JP) ............................ P2002-033115

(51) Int. Cl.
*H04R 25/00* (2006.01)

(52) U.S. Cl. ........................ 381/389; 381/86; 381/365

(58) Field of Classification Search ................. 381/86, 381/302, 338, 386, 389, 365; 181/140, 199
See application file for complete search history.

(56) References Cited

U.S. PATENT DOCUMENTS

| | | | | | |
|---|---|---|---|---|---|
| 4,490,842 | A | * | 12/1984 | Watanabe | 381/86 |
| 4,641,345 | A | * | 2/1987 | Takahashi | 381/86 |
| 5,170,435 | A | * | 12/1992 | Rosen et al. | 381/86 |
| 5,353,261 | A | * | 10/1994 | Kakiuchi et al. | 381/338 |
| 5,687,246 | A | * | 11/1997 | Lancon | 381/338 |
| 5,887,071 | A | * | 3/1999 | House | 381/386 |
| 6,021,208 | A | * | 2/2000 | Kin-Lung | 381/338 |

FOREIGN PATENT DOCUMENTS

JP    4-103791 U    9/1992

* cited by examiner

*Primary Examiner*—Suhan Ni
(74) *Attorney, Agent, or Firm*—Sughrue Mion, PLLC

(57) ABSTRACT

A chair equipped the a speaker is provided with a frame that forms the structural skeleton of the chair, and a speaker unit that is installed to the frame; and wherein hollow pipe is used for the frame, and furthermore wherein the frame functions as an acoustical resonating section or acoustical space for the speaker.

8 Claims, 3 Drawing Sheets

CHAIR EQUIPPED WITH A SPEAKER

BACKGROUND OF THE INVENTION

1. Field of the Invention

This invention relates to a chair or seat equipped with acoustic equipment such as a speaker.

2. Description of the Related Art

A chair equipped with a speaker has a hollow space formed inside the seatback of the seat, and there is an acoustical path that passes through this hollow space, and a speaker is installed that generates sound waves toward the hollow space in the seatback corresponding to the starting end of the acoustical path, and an opening for emitting the sound waves from the speaker is formed on the terminating end of the acoustical path.

However, in this prior chair with speaker, part of the components of the chair were processed such that the speaker box could be installed, or the chair seat was hollowed out such that the speaker box could be installed. In the former case, the speaker box was installed on the outside of the chair, and a new space was necessary for installing the speaker to the chair. Also, in the later case, the chair had to be processed, and due to hollowing out the chair, there was an inconvenience in that the strength of the chair was decreased.

SUMMARY OF THE INVENTION

From the aspect of strength of the construction of the chair, the object of this invention is to provide a chair equipped with a speaker that takes advantage of the use of pipe for the structural frame of the chair and uses it also as an acoustical resonating section or acoustical space, such as to not increase the volume or weight of the chair or decrease the strength of the chair.

The above object of the present invention can be achieved by the chair equipped with a speaker of the present invention. The chair equipped with a speaker is provided with a frame that forms the structural skeleton of the chair, and a speaker unit that is installed to the frame; and wherein hollow pipe is used for the frame, and furthermore wherein the frame functions as an acoustical resonating section or acoustical space for said speaker.

According to the present invention, by using normal hollow pipe for the structural frame of the chair and installing a speaker in the chair, the hollow pipe used for the structural frame of the chair can also be used as an acoustical resonating section or acoustical space, and thus a chair with speaker is possible without increasing the volume or weight of the chair, or decreasing the structural strength of the chair. Also, by using the hollow pipe as an acoustical resonating section or acoustical space, the sound quality improves more than when just using a speaker.

In one aspect of the present invention can be achieved by the chair of the present invention. The chair according to claim 1, wherein said speaker unit is a dynamic electric speaker.

According to the present invention, since the dynamic electric speaker is used as a speaker unit, a large sound of a dynamic range can be transmitted.

In another aspect of the present invention can be achieved by the chair of the present invention. The chair according to claim 1, wherein the speaker unit is a piezoelectric speaker.

According to the present invention, a piezoelectric speaker is used as the speaker unit, so the space occupied by the speaker unit becomes very small and thus simplifies the work of placing it in the chair. Also, since the weight of the entire chair does not increase very much, it is ideal for use in an automobile seat.

In further aspect of the present invention can be achieved by the chair of the present invention. The chair according to claim 1, wherein one open end of said hollow pipe is near or faces the sound-emission side of said speaker unit, and where sound emitted from said speaker unit is guided out from the other open end.

According to the present invention, by using normal hollow pipe for the structural frame of the chair and installing a speaker in the chair, the hollow pipe used for the structural frame of the chair can also be used as an acoustical resonating section or acoustical space, and thus a chair with speaker is possible without increasing the volume or weight of the chair, or decreasing the structural strength of the chair.

Also, by using the hollow pipe as an acoustical resonating section or acoustical space, the sound quality improves more than when just using a speaker. Furthermore, when the opening section formed in the hollow pipe, from which sound is emitted, is close to the ears of the person sitting in the chair, it is possible to hear even higher quality sound.

In further aspect of the present invention can be achieved by the chair of the present invention. The chair according to claim 1, wherein said hollow pipe is used as the frame for a headrest that is attached to said chair, and where said speaker unit and said hollow pipe are acoustically joined such that sound emitted from said speaker unit is guided out through an open end of said hollow pipe.

According to the present invention, by installing the speaker in the chair taking advantage of the hollow pipe that is typically used for the structural frame of the chair and head rest, the hollow pipe for the structural frame of the chair and head rest also functions as the acoustical resonating section, so it is possible to make a chair equipped with a speaker in which neither the volume or weight of the chair increases, and in which there is no decrease in the strength of the chair or headrest.

Moreover, by using the hollow pipe also as the acoustical resonating section, the sound quality is improved more than when just using a speaker. Furthermore, when the opening section formed in the hollow pipe, from which sound is emitted, is close to the ears of the person sitting in the chair, it is possible to hear even higher quality sound.

In further aspect of the present invention can be achieved by the chair of the, present invention. The chair according to claim 1, wherein the speaker unit and the hollow pipe are acoustically joined and the hollow pipe is used as an acoustical space and emits the sound generated by the speaker unit from sound-emission side of the speaker unit.

According to the present invention, by using normal hollow pipe for the structural frame of the chair and installing a speaker in the chair, the hollow pipe used for the structural frame of the chair can also be used as an acoustical resonating section or acoustical space, and thus a chair with speaker is possible without increasing the volume or weight of the chair, or decreasing the structural strength of the chair. Also, by using the hollow pipe as an acoustical resonating section or acoustical space, the sound quality improves more than when just using a speaker.

In further aspect of the present invention can be achieved by the chair of the present invention. The chair according to claim 1, wherein a first opening section and second opening section are formed in the middle of the hollow pipe, and where the sound-emission side of the speaker unit is close to or faces the first opening section, and where sound emitted from the speaker is guided out through the second opening section.

In further aspect of the present invention can be achieved by the chair of the present invention. The chair according to claim 1, wherein the speaker box to which said speaker unit is installed is acoustically joined with said hollow pipe, and where sound that is emitted from the speaker box is guided out through the opening of the hollow pipe in a headrest.

According to the present invention, by installing the speaker in the chair talking advantage of the hollow pipe that is typically used for the structural frame of the chair and head rest, the hollow pipe for the structural frame of the chair and head rest also functions as the acoustical resonating section, so it is possible to make a chair equipped with a speaker in which neither the volume or weight of the chair increases, and in which there is no decrease in the strength of the chair or headrest. Moreover, by using the hollow pipe also as the acoustical resonating section, the sound quality is improved more than when just using a speaker. Furthermore, when the opening section formed in the hollow pipe, from which sound is emitted, is close to the ears of the person sitting in the chair, it is possible to hear even higher quality sound.

DESCRIPTION OF THE PREFERRED EMBODIMENTS

A first embodiment of the chair equipped with a speaker of this invention is explained below.

Figure 1:
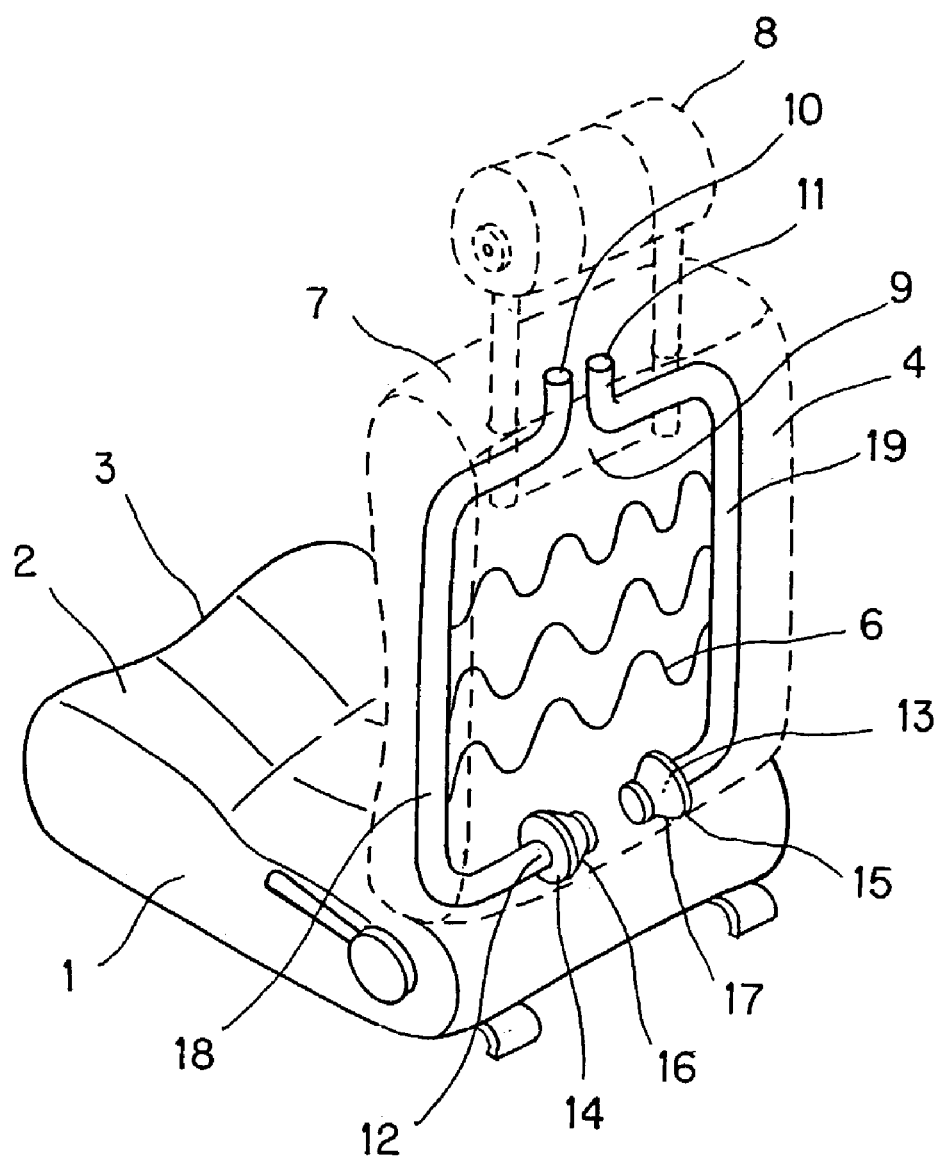
FIG. 1 is a pictorial view of a first embodiment of the invention.

FIG. 1 is a pictorial drawing of the seat section 1 of the chair equipped with a speaker of this embodiment. A cushion material (not shown in the figure) such as resin or cloth is used inside the section 2 of the seat section 1 where a person sits, and a cloth material 3 is used to cover the outer surface. Hollow pipes 18 and 19 are embedded in the backrest or seat section 4. These hollow pipes 18 and 19 form the framework of the seat 4.

Also, in order to increase the rigidity of the seat 4, typically used metal pipe is used. Resin or cloth cushion material (not shown in the figure) and a plurality of springs 6 for supporting the load applied to the seat 4 are located inside the seat 4, and a cloth material 7 is used for the seat cover. There is a headrest 8 at the top of the seat 4, and a headrest slide member 9 of this headrest 8 fits into the seat 4 such that the headrest 8 can be raised or lowered.

The pipe 18 has an open end section 10 located underneath the headrest 8. Similarly, the pipe 19 has an open end section 11 located underneath the headrest 8. Speaker installation flanges 14, 15, to which speaker unit 16 and speaker unit 17 are installed, are formed on the other ends 12, 13 of hollow pipe 18 and hollow pipe 19 at the bottom of the seat 4.

The sound emitted from speaker unit 16 resonates inside the hollow pipe 18 such that the peak of the wavelength of the sound is formed at the open end 10 at the top of the seat and the sound pressure becomes a maximum at the opening. Similarly, the sound emitted from speaker unit 17 resonates inside the hollow pipe 19 such that the peak of the wavelength of the sound is formed at the open end 11 at the top of the seat and the sound pressure becomes a maximum at the opening. Sound is emitted with the maximum sound pressure at these ends, so sounds easily reaches underneath the headrest 8.

Therefore, the sound emitted from the ends 10 and 11 of the hollow pipes 18 and 19 can be heard with good sensitivity in the area around the headrest 8. Since the hollow pipes 18 and 19 are also used as the acoustical resonating section or acoustical space, the performance of low tones is particularly reinforced through resonating, and it is possible to hear sound with a better frequency balance than when listening to the sound directly from the speaker units 16 and 17.

Figure 2:
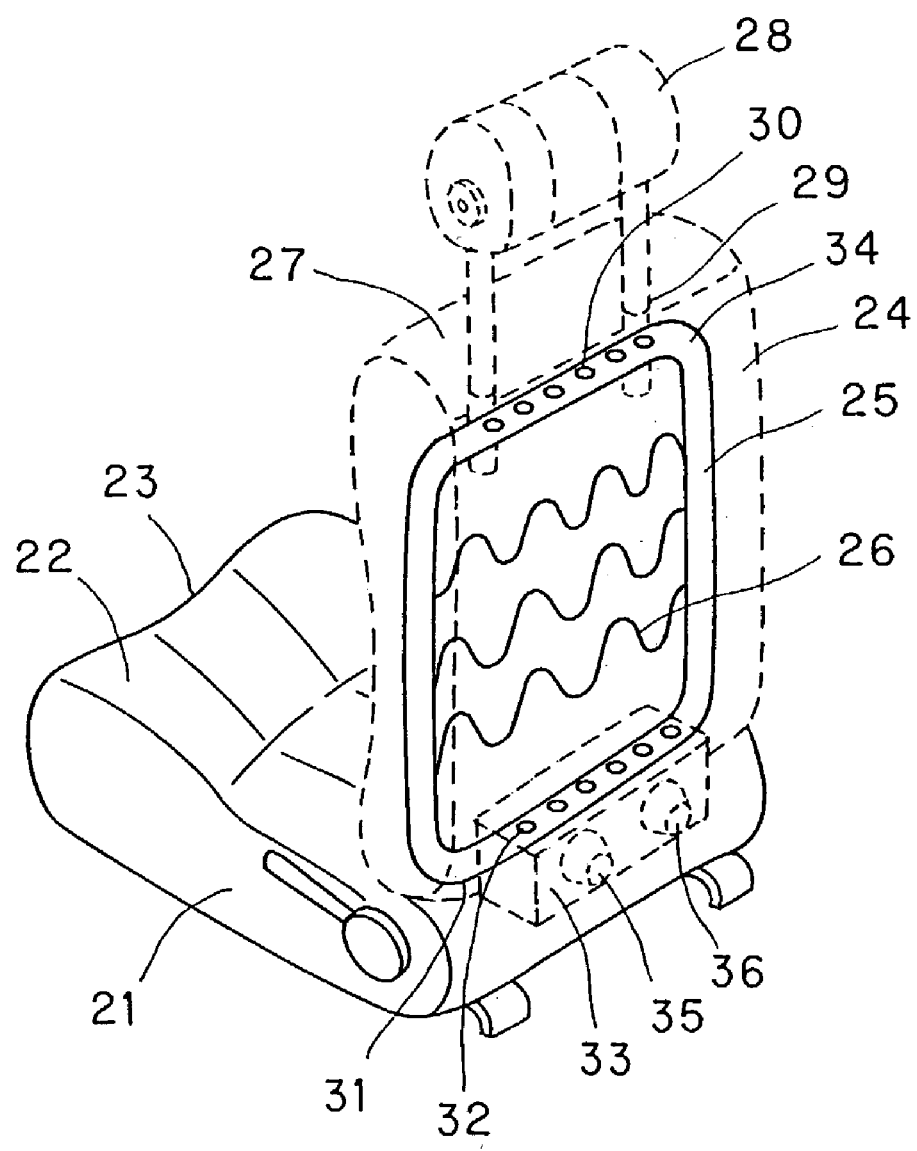
FIG. 2 is a pictorial view of a second embodiment of the invention.

FIG. 2 shows a second embodiment of the chair with a speaker of this invention.

FIG. 2 is a pictorial drawing of the seat section 21 of the chair equipped with a speaker of this embodiment. A cushion material (not shown in the figure) such as resin or cloth is used inside the section 22 of the seat section where a person sits, and a cloth material 23 is used to cover the outer surface. A hollow pipe 25 is embedded in the backrest or seat section 24 of the chair. This hollow pipe 25 forms the framework of the seat 24. Also, in order to increase the rigidity of the seat 24, typically used metal pipe is used.

Cushion material (not shown in the figure) and a plurality of springs 26 for supporting the load applied to the seat are located inside the seat 24, and a cloth material 27 is used for the seat cover. There is a headrest 28 at the top of the seat 24, and a headrest slide member 29 of this headrest 28 fits into the seat such that the headrest 28 can be raised or lowered. Underneath this headrest 28 there is the top section 34 of the hollow pipe 25, and there is a plurality of openings 30 formed in this top section 34 of the hollow pipe 25.

Sound is emitted from these openings 30, so the sound can easily reach the area around the headrest 28. There is also a plurality of openings formed in the bottom section 31 of the hollow pipe 25 at the bottom of the seat 24. The speaker box 33 is located underneath these openings 32. There are speaker units 35, 36 attached to the speaker box 33.

The sound that is emitted from the speaker units 35, 36 passes through the speaker box 33 and enters the hollow pipe 25 from the openings 32 in the bottom section 31 of the hollow pipe 25, then passes through the hollow pipe 25 until it reaches the openings 30 in the top section 34 of the hollow pipe that are open to the top of the seat section. The sound that is emitted from the openings 30 at the top section 34 of the hollow pipe 25 can be heard with good sensitivity in the area of the headrest 28.

Since the hollow pipe 25 also functions as an acoustical resonating section or acoustical space for the speaker units 35, 36, the sound can be heard with better sound quality than when listened to directly from the speaker units 35, 36.

Figure 3:
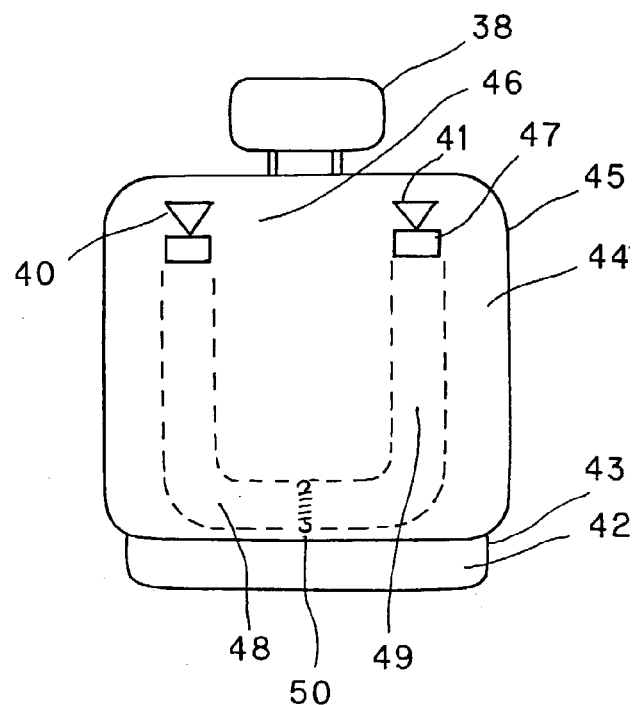
FIG. 3 is a pictorial view of a third embodiment of the invention.

FIG. 3 shows a third embodiment of the chair with a speaker of this invention.

FIG. 3 is a rear view of the seat 44 of the chair with speaker of this embodiment. The section 42 for sitting is filled with a cushion material (not shown in the figure) such as resin or cloth, and the surface is covered with cloth 43. There are hollow pipes 48, 49 embedded in the seat 44 or backrest of the chair. These hollow pipes 48, 49 form the structural skeleton of the seat 44, and in order to increase the rigidity of the seat 44, they are made of typically used metal pipe.

The seat 44 is filled with cushion material (not shown in the figure) and the surface is covered with cloth 45. At the top of the seat 44 there is a headrest 38, and this headrest 38 is capable of moving up or down. Underneath the headrest 38 there is the opening section 40 of the hollow pipe 48 and a speaker unit 46 that is located inside the hollow pipe 48 from the opening section 40.

Similarly, there is also the opening section 41 of the hollow pipe 49 and a speaker unit 47 that is located inside the hollow pipe 49 from the opening section 41. Sound is emitted from these speaker units 46, 47, so the sound can easily reach the headrest 38. Also, hollow pipe 48 and hollow pipe 49 function as the acoustical space for the speaker units 46, 47, so it is possible to hear sound with better sound quality than that heard directly from speaker units 46, 47.

In this embodiment, the inside of the hollow pipes 48, 49 is divided by a pipe connection 50, however, there is absolutely no problem if the pipes are not divided.

Figure 4:
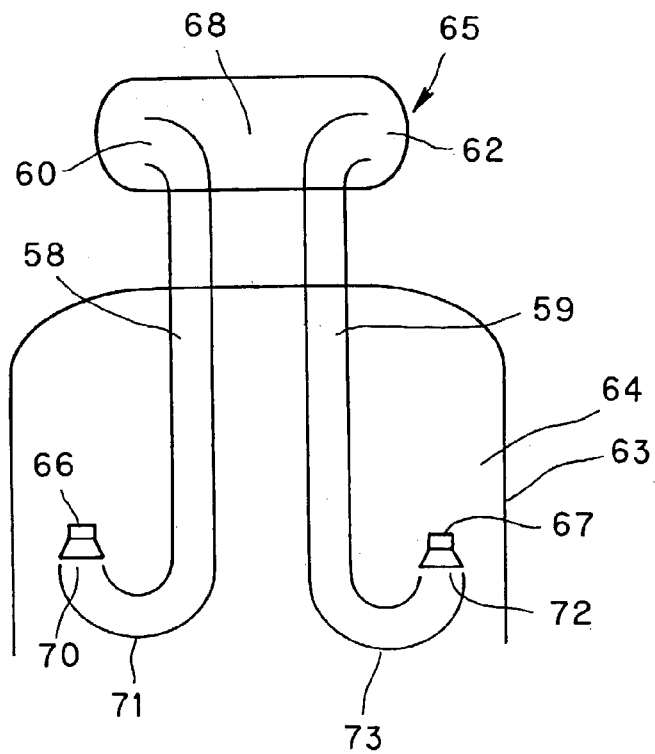
FIG. 4 is a pictorial view of a fourth embodiment of the invention.

FIG. 4 shows a fourth embodiment of the chair with speaker of this invention.

FIG. 4 is a rear view of the seat 64 of the chair with speaker of this embodiment. There are hollow pipes 58, 59 embedded in the seat 64 or backrest of the chair. These hollow pipes 58, 59 form the structural skeleton of the seat 64, and in order to increase the rigidity of the seat 64, they are made of typically used metal pipe.

The seat 64 is filled with cushion material (not shown in the figure), and the surface is covered with cloth 65. There is a headrest 68 at the top of the seat 64. The surface of the headrest 68 is covered with cloth 65, and this cloth material 65 is a material through which sound easily passes. The headrest 68 and seat 64 are connected by the hollow pipes 58, 59. These hollow pipes 58, 59 also have the function of supporting the headrest 68.

The opening section 60 of the hollow pipe 58 and the opening section 62 of the hollow pipe 59 are located inside the headrest 68. On the other end of hollow pipe 58 there is an opening section 70 and a speaker unit 66. Similarly, on the other end of hollow pipe 59 there is an opening section 72 and a speaker unit 67. The section 71 near the opening section 70 of hollow pipe 58 is made of flexible piping so that the speaker unit 66 can be easily installed to the opening section 70, and so that the position of the speaker unit 66 can be freely located.

Similarly, the section 73 near the opening section 72 of hollow pipe 59 is made of flexible piping so that the speaker unit 67 can be easily installed to the opening section 72, and so that the position of the speaker unit 67 can be freely located. The flexible piping is made of metal or plastic, for example. Sound travels from the speaker units 66, 67 and passes through the hollow pipes 58, 59, which form the structural frame of the seat 64 and headrest 68, and is emitted to the outside from the opening sections 60 and 62 in the headrest 68.

Therefore, sound can easily reach the area around the headrest 68. Also, the hollow pipes 58, 59 function as a resonating pipe for the speaker units 66, 67, so it is possible to hear better quality sound with a wider low-frequency range than can be heard directly from the speaker units 66, 67.

In this embodiment, the hollow pipes are used both as supporting pipes and resonating pipes, however, it is also possible to use the hollow pipes 58, 59 as only supporting pipes and use another pipe inside the seat as a resonating pipe.

It is evident that the chair of embodiments 1, 2 and 3 of the invention, when used as special chairs, solve the problems that existed in prior chairs with speakers.

Besides being used as a car seat, the chair equipped with a speaker of this invention can also be used as a normal chair.

Also, this invention can be used exclusively for the low-frequency sound range. In this case, by using material that is particularly good at transmitting low-frequency sound for the cloth material 7, 27, it is possible to improve the sound quality even more.

In the embodiments of this invention in which hollow pipe is used as the acoustical resonating section, the resonating frequency is set by the length of the hollow pipe, and in the case of generating a low-frequency-sound source at the base of the ears of the person sitting in the chair of this invention and obtaining a low-frequency sound effect with a small amount of sound, the length of the hollow pipe is set, for example, such that the base resonance frequency is 55 Hz.

With this kind of construction, the sound source is near the person sitting in the chair, so it is possible to sufficiently detect low sounds even when the sound pressure level is low compared with a normal speaker. Also, the emitted sound is not noisy to those near the person sitting in the chair and does not pose a nuisance to them.

Moreover, there is not a feeling of being oppressed as in the case with a listener wearing headphones directly on the ears, and it is possible to hear surrounding sounds as well. Furthermore, the speakers and amplifier for driving the speakers used in these embodiments can be small. Also, when applying this invention to use in an automobile seat, it is possible to reduce the sound pressure applied to the car door, so it is possible to reduce vibration of the door panel and door frame.

Next, an embodiment of sound-image positioning in which a low-frequency sound source is generated at the base of the ears of a person sitting down as described above will be explained.

Low-range sound (for example a sound signal that is 200 Hz or less) is produced by acoustical resonance using the hollow pipe of this invention, and another normal speaker is located in front of the person sitting down, and this speaker produces middle and high-range sound (for example a sound signal that is greater than 200 Hz). With this kind of embodiment, there is no sense of direction for low-frequency sounds in the signal, so the frequency range for vocal signals can be located in the front.

Also, since low-frequency sound is produced at the base of the ears of the person sitting down, there is a very good feeling that the sound is spread out (realistic feel), and since resonance in the hollow pipes is due to air only, the sound quality is soft. When high-frequency sound is emitted at the base of the ears the position of the sound for vocals is not set.

When this embodiment is applied to the speakers for an automobile, for example, the speaker unit using hollow pipes is assembled in the seat, and the normal speakers for middle- and high-frequency sounds are installed in the dashboard at the front of the car or in the front doors.

By using normal hollow pipe for the structural frame of the chair and installing a speaker in the chair, the hollow pipe used for the structural frame of the chair can also be used as an acoustical resonating section or acoustical space, and thus a chair with speaker is possible without increasing the volume or weight of the chair, or decreasing the structural strength of the chair. Also, by using the hollow pipe as an acoustical resonating section or acoustical space, the sound quality improves more than when just using a speaker. Particularly, the sound quality of low-frequency sound is improved.

The entire disclosure of Japanese Patent Application No. 2002-33115 filed on Feb. 8, 2002 including the specification, claims, drawings and summary is incorporated herein by reference in its entirety.

What is claimed is:

1. A chair equipped with a speaker wherein said speaker comprises:
    a frame that forms the structural skeleton of said chair, wherein hollow pipe is used for said frame,
    a speaker unit that is installed to said frame, and wherein a front, sound emission side, of the speaker unit faces an opening of the hollow pipe frame, functioning as an acoustical resonating section or acoustical space for said speaker unit.

2. The chair according to claim 1, wherein said speaker unit is a dynamic electric speaker.

3. The chair according to claim 1, wherein said speaker unit is a piezoelectric speaker.

4. The chair according to claim 1, wherein one open end of said hollow pipe is near or faces the sound-emission side of said speaker unit, and where sound emitted from said speaker unit is guided out from another open end of said hollow pipe.

5. The chair of according to claim 1, wherein said hollow pipe is used as the frame for a headrest that is attached to said chair, and where said speaker unit and said hollow pipe are acoustically joined such that sound emitted from said speaker unit is guided out through an open end of said hollow pipe.

6. The chair according to claim 1, wherein said speaker unit and said hollow pipe are acoustically joined and said hollow pipe is used as an acoustical space and emits the sound generated by said speaker unit from sound-emission side of said speaker unit.

7. The chair according to claim 1, wherein a first opening section and second opening section are formed in the middle of said hollow pipe, and where the sound-emission side of said speaker unit is close to or faces said first opening section, and where sound emitted from said speaker is guided out through said second opening section.

8. The chair according to claim 1, wherein a speaker box, to which an at least one speaker unit is installed, is acoustically joined with said hollow pipe, and where sound that is emitted from said speaker box is guided out through the opening of said hollow pipe in a headrest, and wherein the front of the at least one speaker faces into said speaker box.

* * * * *